Aug. 3, 1965  R. B. FULLER  3,197,927
GEODESIC STRUCTURES
Filed Dec. 19, 1961  6 Sheets-Sheet 1

20 PER SPHERE
SPHERICAL ICOSAHEDRON

12 PER SPHERE
SPHERICAL DODECAHEDRON

30 PER SPHERE
SPHERICAL TRICONTAHEDRON

INVENTOR.
RICHARD BUCKMINSTER FULLER
BY
ATTORNEYS.

Aug. 3, 1965  R. B. FULLER  3,197,927
GEODESIC STRUCTURES
Filed Dec. 19, 1961  6 Sheets-Sheet 2

INVENTOR.
RICHARD BUCKMINSTER FULLER
BY
*Robertson & Smythe*
ATTORNEYS.

Aug. 3, 1965

R. B. FULLER 3,197,927

GEODESIC STRUCTURES

Filed Dec. 19, 1961

INVENTOR.
RICHARD BUCKMINSTER FULLER
BY
*Robertson & Smythe*
ATTORNEYS.

Aug. 3, 1965 R. B. FULLER 3,197,927
GEODESIC STRUCTURES
Filed Dec. 19, 1961 6 Sheets-Sheet 4

INVENTOR.
RICHARD BUCKMINSTER FULLER
BY
ATTORNEYS.

Aug. 3, 1965                R. B. FULLER                3,197,927
                          GEODESIC STRUCTURES
Filed Dec. 19, 1961                                 6 Sheets-Sheet 5

INVENTOR.
RICHARD BUCKMINSTER FULLER
BY
*Robertson & Smythe*
ATTORNEYS.

INVENTOR.
RICHARD BUCKMINSTER FULLER
BY
ATTORNEYS.

United States Patent Office 3,197,927
Patented Aug. 3, 1965

3,197,927
GEODESIC STRUCTURES
Richard Buckminster Fuller, 407 S. Forest St.,
Carbondale, Ill.
Filed Dec. 19, 1961, Ser. No. 160,450
7 Claims. (Cl. 52—81)

The invention relates to geodesic structures as comprised in the fabrication of domes, spheres, and spherical segments or truncations, as used in buildings and other architectural forms, or for other purposes.

The fundamentals of geodesic structures are described in my prior Patent No. 2,682,235, granted June 29, 1954, in which are defined some of the more common terms in the relatively new art of geodesics. The present specification is addressed primarily to those who have a practical working knowledge of geodesic construction although it should be readily understood as well by architects and engineers following a background reading of the prior patent aforesaid.

All omni-triangulated geodesic grids may have their triangles collected into hexagons plus twelve pentagons or into omni-diamond patterns as well as in simple omni-triangulated patterns. Thus when we look at a typical geodesic "dome," we may see an over-all pattern which emerges as a honeycomb of hexagons (with twelve pentagons as aforesaid), or as diamonds, or as simple triangles. Sometimes the hexagons and pentagons will be of pyramidal form and thus have triangular facets. My present invention relates to a particularly advantageous development of the hexagonal-pentagonal manifestation of the geodesic pattern, having regard however to the possibility that the hexagons in the pattern may be faceted so as to reveal a typical pyramidal sub-form.

The "building blocks" of my present invention may consist of hexagonal sheets or plates, or of members which go together to form a framework defining openings of hexagonal and pentagonal form. In either case, openings in the spherical shell will appear at the vertexes and centers of the icosahedron triangles. These openings may be either circular or polygonal in form as desired. In all cases it is contemplated that the openings may be closed to form a continuous roof or wall as by the means which will be described herein.

Whether assembled initially from sheets or plates on the one hand or as an open framework on the other, the construction comprises tension rings of either circular or polygonal form, and in certain of my preferred constructions these tension rings will be interconnected with one another to form a comprehensive geodesic network of tension elements conforming to the geodesic pattern of the "building blocks."

In general my invention consists of a structure of generally spherical form comprising a plurality of members joined together in a geodesic pattern of hexagons and pentagons and which includes tension elements disposed around the perimeters of areas within the geodesic pattern, these being areas whose borders are defined by edges of adjoining members. The tension elements are arranged to transmit forces from member to member throughout the geodesic pattern of hexagons and pentagons. This general statement will be easier to understand after study of the accompanying drawings and detailed description illustrative of the best mode contemplated by me for carrying out my invention.

FIGS. 5 to 10 inclusive are detail views of various types of members used as the principal components of the structures; FIGS. 5 to 8 relating to components for the type of structure shown in FIG. 3, and FIGS. 9 and 10 to components for the type of structure shown in FIG. 4.

Figure 5:
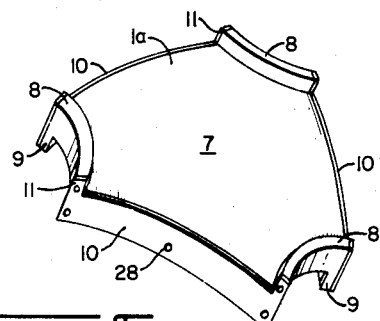
Figure 6:
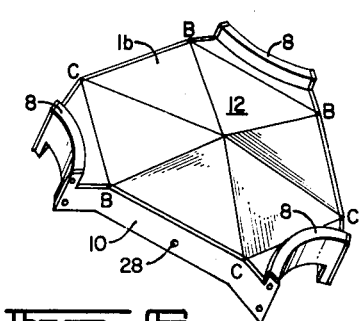
Figure 7:
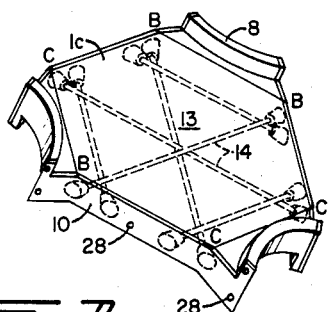

FIG. 5 shows a component of generally spherical form,

FIG. 6 a component of hexagonal pyramidal form,

FIG. 7 a component of flat hexagonal form, and

Figure 8:
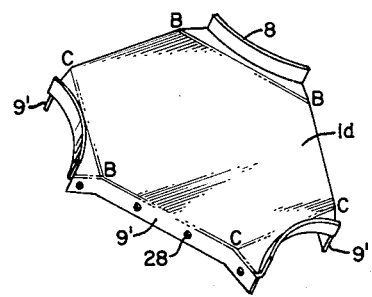

FIG. 8 a component similar to FIG. 7 such as may be formed of sheet metal or the like.

Figure 9:
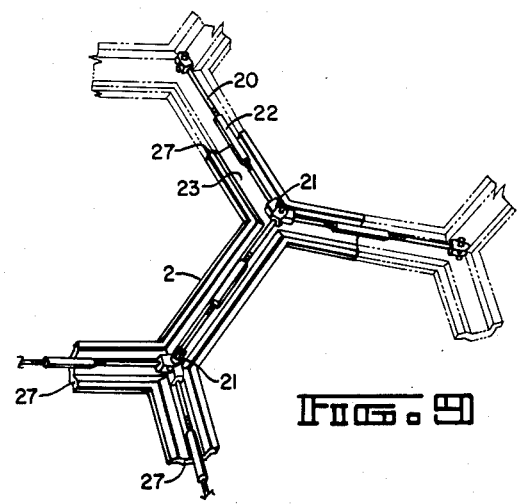

FIG. 9 shows a component of a framework constructed in accordance with my invention in its general relationship to two adjacent components of like construction.

Figure 10:
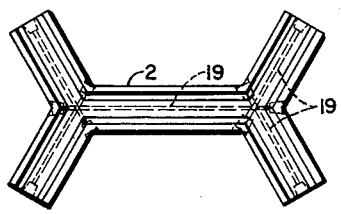

FIG. 10 is a detail plan view of the primary component of FIG. 9 showing a system of pre- or post-tensioning rods which may be used therein.

Figure 11:
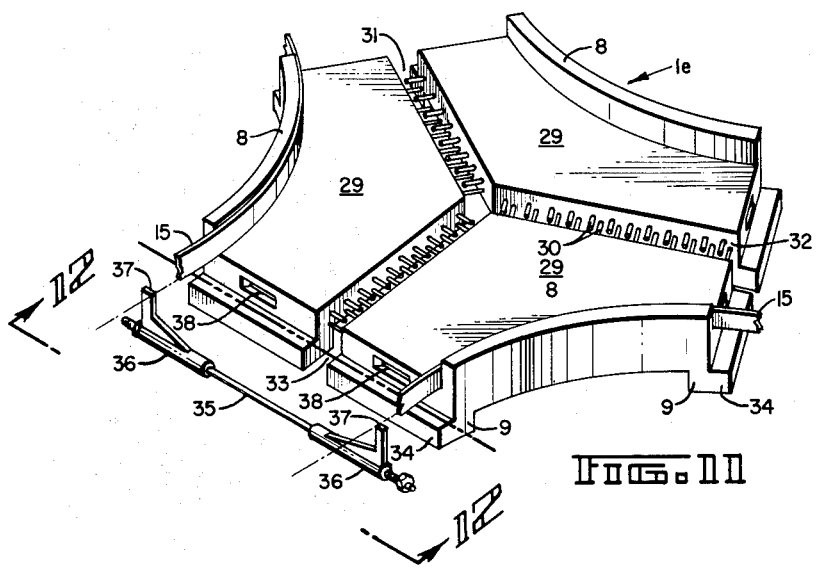

FIG. 11 is a view of a sub-component assembly for producing members similar to those of FIGS. 5, 6 and 7.

Figure 12:
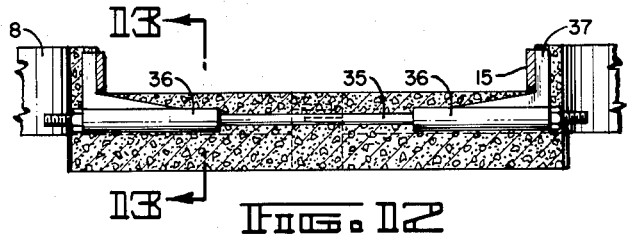

FIG. 12 is a view taken as indicated at 12—12 in FIG. 11 following assembly and grouting of sub-components and main components.

Figure 13:
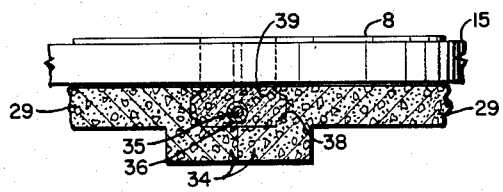

FIG. 13 is a detail cross sectional view taken on the line 13—13 of FIG. 12.

Figure 14:
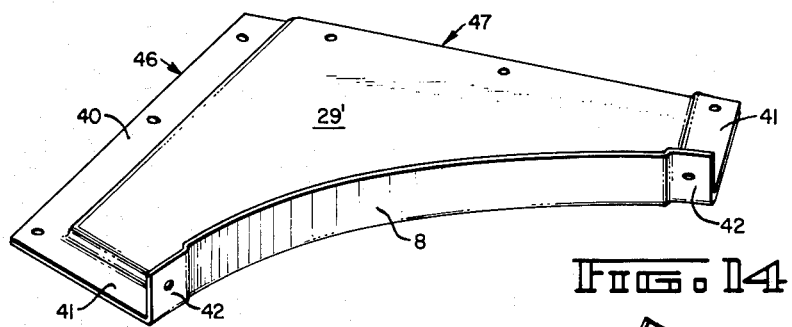

FIG. 14 is a view of a sub-component for producing members similar to those of FIG. 8 or 10, but of modified construction.

Figure 15:
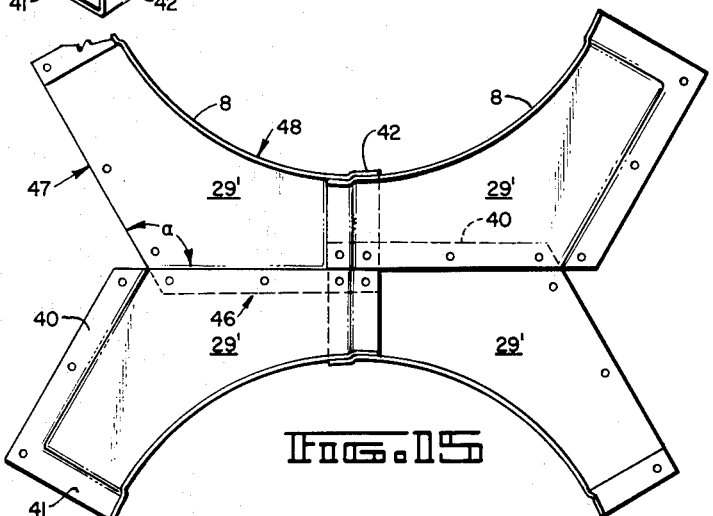

FIG. 15 shows one form of component produced from an assembly of FIG. 14 sub-components.

Figure 16:
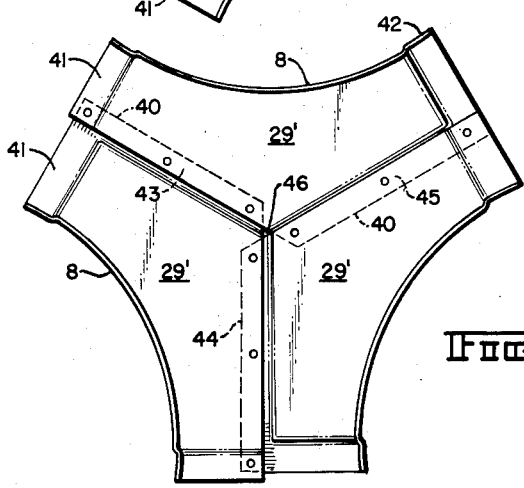

FIG. 16 shows another form of component produced from an assembly of FIG. 14 sub-components.

Figure 1:
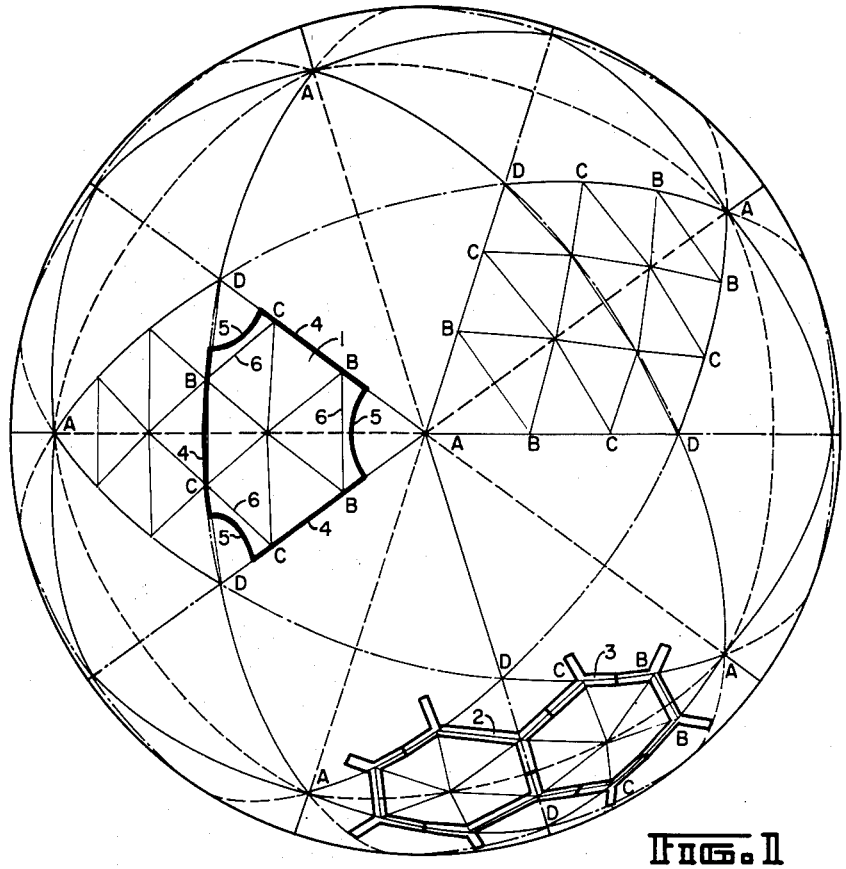
FIG. 1 is a diagram showing my preferred geodesic layout as applied to a 6-frequency breakdown known in the art as the "6v triacon" ("v" standing for frequency).
Figure 2:
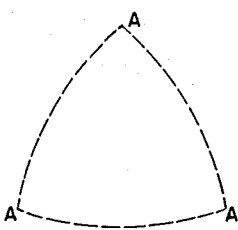
FIG. 2 is a diagram to explain the spherical geometry of the great circle geodesic frame of reference.
Figure 2:
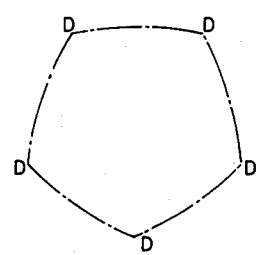
Figure 2:
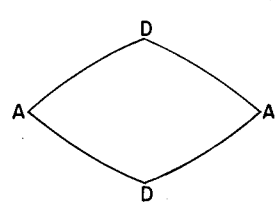

Referring to FIGS. 1 and 2, the dotted lines represent the sides of the triangles AAA of a spherical icosahedron, of which there are twenty triangles per sphere. The dot and dash lines represent the sides of the pentagons DDD, etc., of the spherical dodecahedron, of which there are twelve pentagons per sphere. The full lines represent the sides of the diamonds ADAD of the spherical tricontahedron, of which there are thirty diamonds per sphere.

Upon one of the diamond faces of the tricontahedron is shown a typical layout for a 3-way grid of the type known in the art as a "triacon" breakdown ABCD. This 3-way grid may equally be considered as being based upon any of the three geodesic forms shown in FIGS. 1 and 2, namely the icosahedron, the dodecahedron or the tricontahedron, the relationship between the three being shown as follows:

For simplicity the suffix "hedron" will be omitted from the descriptive names of the polyhedrons.

The vertexes of the triconta comprise:

Either—
  2 icosa vertexes ⎱ icosa
  2 icosa centers ⎰ relation

Or—
  2 dodeca vertexes ⎱ dodeca
  2 dodeca centers ⎰ relation

Each icosa vertex is a dodeca center
Each dodeca vertex is an icosa center

From the foregoing analysis it will be understood that the icosahedron is the inversion of the dodecahedron or vice versa, and that the same division of the sphere results regardless of whether one considers that the breakdown has been based upon the icosahedron, the dodecahedron or the tricontahedron. Cf. Felix Klein, Elementary Mathematics from an Advanced Standpoint: Arithmetic, Algebra Analysis, translated from 3rd (1925) edition; New York, Dover Publications; p 123.

The 3-way grid pattern ABCD has been shown in FIG. 1 on three of the faces of the tricontahedron. In the one which appears at the left center, there has been superimposed a heavy black line illustrating a sheet or plate-like member 1 of generally hexagonal form which constitutes one of the components, or members, of the construction illustrated in FIG. 3. Upon the 3-way grid shown at the bottom of FIG. 1, is superimposed a framework comprising a plurality of members 2, 3. In the case of members 1, three of the edges, those designated 4, are aligned with the construction lines of the 3-way grid pattern, i.e. with the sides of the tricontahedron or the grid lines within. The circular sides 5 of member 1 may be considered as being related to grid lines 6 and, if desired, could be made to coincide with such grid lines, in which case the sides 5 would be straight instead of curved.

In the case of members 2 and 3, it is the centerlines of the members which coincide approximately with the grid lines. Thus, as in the case of the differing embodiments described in my prior Patent 2,682,235 aforesaid, the alignment of the structural members may be such that the longitudinal center lines thereof are arranged along geodesic lines or such that their edges or selected ones of their edges are arranged along geodesic lines.

Figure 3:
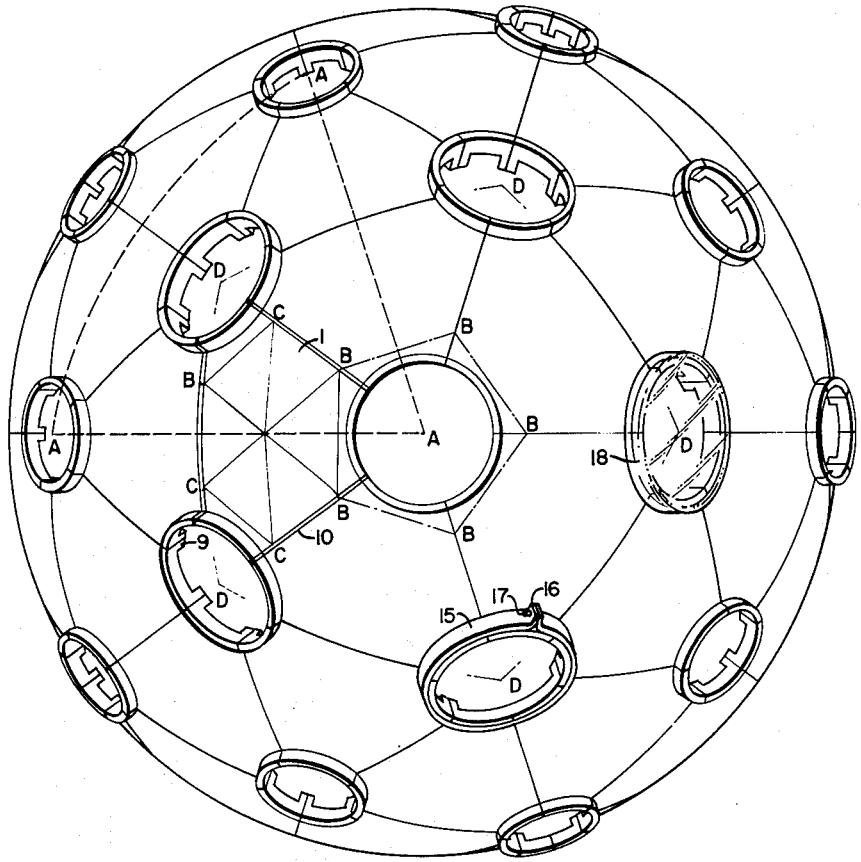
FIG. 3 is a view of one form of structure embodying my invention. It may be considered as showing either the top plan view of a hemispheric dome or simply as a side view of a spherical structure.

In FIG. 3 we see a plurality of the members 1 assembled to form a dome or sphere as based upon what may be considered as the icosahedron pattern AAA or the dodecahedron pattern DDDDD or the tricontahedron ADAD. The members 1 may be of any of the several forms shown in FIGS. 5 to 8 designated respectively 1a, 1b, 1c, 1d. The FIG. 5 form has a spherical surface 7, upwardly extending flanges 8 at three sides, these being in the form of circular segments extending along the lines 5 of FIG. 1, and downwardly extending flanges 9 along the remaining edges of member 1a, namely the edges corresponding to 4 in FIG. 1. Member 1a may be made of any suitable construction material such as concrete, plastic resin, light-weight insulating concrete, etc. and may be reinforced along three of its sides as by means of metal strips 10. As shown, these metal strips are formed with upwardly extending lugs 11 for a purpose which will be explained later.

The structural component 1b shown in FIG. 6 may be used in conjunction with, or in place of, the component 1a of FIG. 5. In the 1b form, the construction is essentially the same except for the fact that the surface 12 is of pyramidal form instead of being spherical.

The further embodiment 1c shown in FIG. 7 has a flat surface 13 and is reinforced by a series of pre- or post-tensioned rods or elements 14 forming a 3-way grid harmonizing with the stress pattern of the 3-way grid ABCD previously described. Similar reinforcement may be used in the case of members 1a and 1b. Thus any of the members 1a, 1b, 1c may consist of pre- or post-tensioned bodies comprising tensioned elements arranged in a 3-way grid pattern complementing the geodesic pattern formed by such members. By this means each of the basic components of the structure may be locally stressed as distinguished from comprehensive stressing of the structure as a whole in a manner which remains to be described.

The form of component 1d shown in FIG. 8 may conveniently be made from sheet metal such as a strong aluminum alloy. In this member the upwardly extending arcuate flanges 8 and downwardly extending flanges 9' can be formed in a drawing press. In this construction the flanges 9' take the place of flanges 9 of the components of FIGS. 5–7 and also take the place of the separate metal strips 10 thereof.

The relationship of the several forms of basic components shown in FIGS. 6–8 to the geodesic pattern of FIG. 1 and corresponding geodesic structuring of FIG. 3, is shown by the corresponding grid line lettering BB, CC, BC, etc. The theoretical relationship is the same also in the case of the component of FIG. 5 although certain of the grid lines become imaginary by reason of the fact that the surface is spherical and therefore cannot reveal the grid lines which show up in the other forms. Nevertheless the 3-way stress pattern remains both as to the basic component itself and as to the pre- or post-tensioned rods 14 in the cases where such rods are used.

It will be understood that each of the faces of the spherical tricontahedron of the structure may be laid out on the same 3-way grid shown on three of such faces in FIG. 1. The basic components are then assembled according to the pattern thus produced. In my preferred construction according to this embodiment of the invention, the basic components are held together by tension rings 15 made of a material of good tensile strength. These rings also preferably are constructed with suitable tightening or clamping means such as provided by the flanged ends 16 and a bolt 17.

Another way of holding the basic components together is by means of flanged "manhole covers" 18 which can be made of any suitable material and may be either transparent, translucent or opaque according to the intended use to which the structure is to be put. The flanges of the covers 18 may be arranged to engage the outer surfaces of the collar formed by the several arcuate segments 8 of the basic components or the flanges of the covers may be engaged over the tension ring 15. In the former case the covers may themselves constitute means for tensioning the basic components whereas in the latter case they may be used simply as a means for closing the openings in the structure.

From the foregoing description it will be discerned that I have provided a structure of generally spherical form comprising a plurality of members 1 which may be of one or more of the several forms 1a, 1b, 1c and 1d, such members being joined together in a geodesic pattern comprising hexagons and pentagons (the pentagons always coinciding with one of the openings in the structure), and tension elements such as 15 disposed around the perimeters of areas within the geodesic pattern whose borders are defined by edges 8, 8 etc. of adjoining members comprised in groups of such members surrounding the respective areas. The tension elements transmit forces from member to member throughout the geodesic pattern. The aforesaid tension elements 15 preferably are interconnected one to another as by means of the strips 10, the upwardly extending lugs 11 of which are engaged by the tension rings 15 to form a comprehensive geodesic network of tension elements conforming to the geodesic pattern of said members. Where this is done in combination with the use of the pre- or post-tensioning rods 14 previously described, the resulting structure is characterized by locally stressed basic components plus comprehensive stressing of the structure as a whole. In this construction the "holes" in the geodesic 3-way grids are always surrounded and "healed" through diffusion of the stress patterns in the members themselves. The true result of this can only be accurately described as an omni-wave diffusion of the stress pattern as obtained by reason of the geodesic structuring described.

Figure 4:
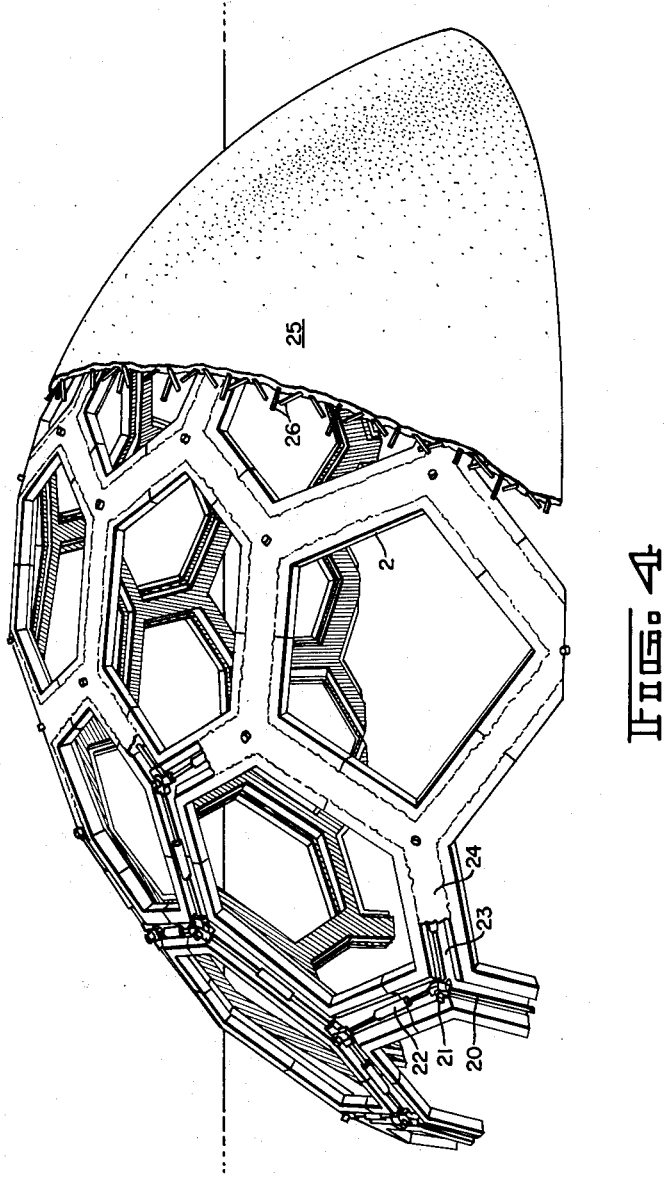
FIG. 4 is a perspective view of a hemispheric dome constructed in accordance with another embodiment of my invention.

In the alternate embodiment illustrated diagrammatically in the lower part of FIG. 1 and structurally in FIGS. 4, 9 and 10, we have a framework of members joined together in the same geodesic pattern comprising hexagons and pentagons but in this case the hexagons will be initially open, rather than closed as was the case with the surfacing components of the FIG. 3 construction. The form of the members used in making the structure of FIG. 4 is shown in FIGS. 9 and 10. These members may be cast of concrete with or without the use of the pre- or post-tensioning rods 19, or may be made of other suitable materials. Where the local pre- or post-tensioning rods 19 are used in the manner shown in FIG. 10, it will be observed that such rods substantially coincide with the geodesic pattern of the dome. As before, we have tension rings comprised of the tension elements 20 linked together by bolts and clevises 21 and tightened as by means of turnbuckles 22. These tension rings likewise follow the geodesic pattern of the dome. I describe them as tension elements disposed around the perimeters of areas within the geodesic pattern whose hexagonal or pentagonal borders are defined by edges of adjoining members comprised in the groups of members surrounding the respective areas. Also as before, the tension elements 20 are arranged to transmit forces from member to member throughout the geodesic pattern. Notice that the locally stressed pre- or post-tensioning elements 19 are, or may be, substantially parallel with the tension elements 20 of the comprehensive geodesic network.

The members 2 of the embodiment of FIGS. 4, 9 and 10 preferably are formed with troughs 23 in their outer surfaces to receive the tensioning structure 20, 21, 22. Following tightening of the turnbuckles 22, the troughs 23 may then be filled with a cement or other grouting material 24, resulting in the smooth surfaced framework shown in the central portion of FIG. 4. Later, with the use of suitable forms, the framework may be covered with a monolithic shell of concrete or the like 25, shown at the right-hand of FIG. 4. This covering shell may if desired be reinforced with a network of reinforcing rods 26. When this is done, I prefer to arrange the reinforcing rods 26 harmoniously with the 3-way grid pattern of the basic structure of the framework. Thus the rods 26 may conform to a 3-way grid pattern similar to that shown at ABCD, ABCD in FIG. 1.

The sides 4 of the members 1 (FIG. 1) and the ends 27 of the members 2 (FIG. 9) may be provided with complementary dowels and recesses 28 as indicated for example in FIG. 7, to assist in aligning the several members during assembly thereof.

The modified construction of FIGS. 11 to 13 comprises a sub-assembly in which the main component 1e includes three sub-components 29 all of which can be of identical size and shape. By varying the spacing between the three sub-components along the parts of the Y formed by the proximate edges thereof, it is possible to assemble main components of a variety of forms and sizes so as to accommodate them for use in constructing spheres or domes of even the higher frequencies of geodesic breakdown. Thus a single sub-component can be used to make a plurality of different main components wherever the geodesic construction is not adapted to construction for one size and form of main component. Where desired, the sub-components 29 may be molded or cast of concrete, plastic resin, light-weight insulating concrete, etc., and in such cases may include reinforcing rods projecting into meeting or overlapping relation to those of the other associated subcomponents as at 30. The width of the spaces 31, 32 and 33 is variable according to the geometry of the geodesic breakdown. Upwardly and downwardly extending flanges 8 and 9 may be provided as before. Flanges 9 are preferably extended laterally as at 34 to meet or approach corresponding extensions of the flanges of adjacent main components.

After the sub-components 29 have been brought into the desired predetermined relation one to another they are grouted or cemented together. Then they are ready for assembly in the manner of FIG. 3 with the use of tension rings 15 and/or manhole covers 18. Tension elements 15 preferably are interconnected one to another as by means of rods 35, FIGS. 11–13, and suitable anchors 36 having projections 37 which are arranged to engage tension elements 15 in the manner shown in FIG. 12. The ends of rods 35 are threaded to receive the nuts shown for drawing the anchors together to produce an effective comprehensive stressing of the structure through the interaction of the tension elements 15 and rods 35.

Recesses 38 may be provided in the ends of member 1e to interlock with the grout or cement used for connecting and sealing the proximate ends of the adjacent main components of a structure made from this form of component. When so cemented together, the grout or cement will fill the groove between the adjacent members formed by their proximate ends and the meeting lateral extensions 34 thereof which close or partly close the bottom of the groove to make a mold or partial mold for the grout. The grout 39 surrounds, and seals in, the tension rod 35 and anchors 36.

The sub-components of the embodiment shown in FIGS. 14–16 may conveniently be made of sheet metal or fiberglass, but other suitable materials may be employed as desired. According to this embodiment the principal advantages described with reference to FIGS. 11–13 can be secured for component members used in either the general type of construction shown in FIG. 3 or that shown in FIG. 4, or in other constructions wherein the hexagonal members are shrunk by enlargement of the circular areas of FIG. 3 to produce diaper-form components (FIG. 16). Again we have three identical subcomponents 29'. Each subcomponent 29' consists of an elongated member having two sides which meet at an angle $a$ which is on the order of 120°, these two sides forming a generally convex longitudinal edge. Opposite this edge is a generally concave edge 48 which may be arcuate as shown, or polygonal. The opposed convex and concave longitudinal edges create a shape which resembles that of the familiar Australian boomerang. (This also describes the shape of the sub-components 29 shown in FIG. 11.) The sub-component 29' preferably has offset flanges 40, 41, 42 for flush assembly of the several subcomponents, with overlaps between four adjoining subcomponents (FIG. 15) forming a member generally similar to the one shown in FIG. 10, or between three adjoining sub-components (FIG. 16) forming a member generally similar to those of FIGS. 5–8 but of different proportioning. Notice the variable overlaps at 43, 44, 45 in FIG. 16. The sub-components are secured together at the overlaps, and sealed at the iris 46. Adhesives or mechanical fastenings, or both, may be used at the overlaps as desired. In some cases pressure sensitive adhesives will be found satisfactory, particularly when supplemented by mechanical fastenings. The components represented in FIGS. 15 and 16 will as a general rule be assembled at the factory, using jigs for predetermining the several different relationships of the sub-components.

The structures I have described have been based upon what is known as a 6-frequency regular triacon, meaning that the major axes of the faces of the tricontahedra are divided into six modules according to a layout in which the sides of the tricontahedra are evenly subdivided (AB=BC=CD). If the frequency is increased to 12, using the same regular triacon breakdown, the basic components of the FIG. 3 construction will require only two primary types of which the number two's are left and right, one being a mirror image of the other. The longest diameter of the largest hexagon in the pattern will have a chord factor of 0.22; therefore using hexagons of a maximum 20 feet in diameter, a dome or sphere of 182-foot diameter will be produced. A 150-foot diameter dome in the 12-frequency breakdown would have hexagons of 16.5-foot maximum diameter. If we reduce the maximum diameter of the components to 10 feet for practicable delivery by truck, the 12-frequency layout will permit construction of a dome 88 feet in diameter at the equator. Similarly, a 24-frequency layout, using only four main types of components, will permit construction of a dome 176 feet in diameter whose components are of a size to be delivered by conventional motor transport. The boomerang-form sub-components of FIGS. 11–16 serve so to simplify the sub-componentation that, regardless of size and frequency, even the largest domes can be constructed with the use of just one design of sub-component.

The terms and expressions which I have employed are used in a descriptive and not a limiting sense, and I have no intention of excluding equivalents of the invention described and claimed.

I claim:

1. A structure of generally spherical form comprising a framework including a plurality of six sided panel members, three sides of which are straight and three sides curved, said curved sides terminating in upturned flanges projecting radially in respect of the sphere on which the structure is predicated, the curved sides of adjacent members forming a circular opening bounded by said upturned flanges, said panel members being innerconnected and drawn together by a tension ring disposed around the circular opening and having a clamping engagement with the upturned flanges.

2. A structure according to claim 1 in which metal tension members extend along the straight sides of the panel members, said tension members having upturned lugs engaged by said tension ring.

3. A structure according to claim 1 in which said panel members consist of bodies placed under compressive stress by tension elements extending between the several straight sides of the panel members, each tension element being substantially parallel to one of said straight sides.

4. A structure according to claim 1 in which said panel members consist of bodies having a flat outer face surface and in which said straight sides terminate in downturned flanges projecting radially of said sphere.

5. A structure according to claim 1 in which said panel members consist of bodies having a generally dome-shaped outer face surface.

6. A structure according to claim 1 in which said panel members consist of bodies which have an outer face surface having the configuration of a six-sided pyramid.

7. A structure according to claim 1 in which the circular opening bounded by said upturned flanges is closed by a cover member engaged over the flanges of the opening.

References Cited by the Examiner

UNITED STATES PATENTS

| | | | |
|---|---|---|---|
| 2,602,323 | 7/52 | Leemhuis | 50—263 |
| 2,918,992 | 12/59 | Gelsavage | 50—162 |
| 3,058,550 | 10/62 | Richter | 50—52 |
| 3,061,977 | 11/62 | Schmidt | 50—52 |

HENRY C. SUTHERLAND, *Primary Examiner.*

JACOB L. NACKENOFF, *Examiner.*